United States Patent
Ye et al.

(10) Patent No.: US 9,031,021 B2
(45) Date of Patent: May 12, 2015

(54) METHOD AND APPARATUS FOR INDICATING PHYSICAL RESOURCE BLOCK PAIRS FOR EPDCCH

(71) Applicant: Alcatel-Lucent USA Inc., Murray Hill, NJ (US)

(72) Inventors: Sigen Ye, New Providence, NJ (US); Matthew P J Baker, Murray Hill, NJ (US); Fang-Chen Cheng, Randolph, NJ (US); Shin Horng Wong, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 127 days.

(21) Appl. No.: 13/630,633

(22) Filed: Sep. 28, 2012

(65) Prior Publication Data

US 2014/0092815 A1   Apr. 3, 2014

(51) Int. Cl.
*H04W 72/12* (2009.01)
*H04W 72/04* (2009.01)
*H04L 1/00* (2006.01)

(52) U.S. Cl.
CPC .............. *H04W 72/042* (2013.01); *H04L 1/00* (2013.01); *H04W 72/12* (2013.01)

(58) Field of Classification Search
CPC ...... H04L 5/003; H04L 5/0092; H04W 72/04
See application file for complete search history.

(56) References Cited

U.S. PATENT DOCUMENTS

| | | | |
|---|---|---|---|
| 2011/0110251 A1* | 5/2011 | Krishnamurthy et al. | 370/252 |
| 2013/0039284 A1* | 2/2013 | Marinier et al. | 370/329 |
| 2013/0242885 A1* | 9/2013 | Zhu et al. | 370/329 |
| 2014/0105155 A1* | 4/2014 | Kim et al. | 370/329 |

OTHER PUBLICATIONS

3GPP TS 36.211 V11.0.0 (Sep. 2012) "3rd Generation Partnership Project; Technical Specification Group Radio Access Network; Evolved Universal Terrestrial Radio Access (E-UTRA); Physical Channels and modulation (Released 11)." Technical Specification.

* cited by examiner

*Primary Examiner* — John Blanton
(74) *Attorney, Agent, or Firm* — Harness, Dickey & Pierce (57) ABSTRACT

A method of specifying one or more sets of one or more physical resource block (PRB) pairs from among a plurality of PRB pairs in a subframe that a user equipment (UE) is to monitor for an enhanced physical downlink control channel (EPDCCH) includes sending, from a base station, a first representation of the PRB blocks, the representation including a plurality of bits, a total number of the plurality of bits being less than a product of total number of the plurality of PRB pairs and a total number of the one or more sets, the first representation indicating which of the plurality of PRB pairs are in at least one of the one or more sets of one or more PRB pairs the UE is to monitor for the EPDCCH.

20 Claims, 6 Drawing Sheets

METHOD AND APPARATUS FOR INDICATING PHYSICAL RESOURCE BLOCK PAIRS FOR EPDCCH

BACKGROUND

1. Field

Example embodiments relate generally to providing and/or using information regarding physical resource blocks (PRB) that are associated with an enhanced physical downlink control channel (EPDCCH).

2. Related Art

In Release 11 of LTE-Advanced, a new control channel known as the Enhanced Physical Downlink Control Channel (EPDCCH) is provided which is transmitted in one or more PRB pairs in a subframe. The available transmission resources in a subframe are divided into PRB pairs in the frequency domain, each PRB pair occupying 180 kHz. EPDCCH is an enhancement to the Physical Downlink Control Channel (PDCCH) which may offer higher capacity for control channels and efficient use of resources via spatial reuse multi-user multiple input multiple output (MU-MIMO) and beamforming.

SUMMARY

According to at least one example embodiment, a method of specifying one or more sets of one or more physical resource block (PRB) pairs from among a plurality of PRB pairs in a subframe that a user equipment (UE) is to monitor for an enhanced physical downlink control channel (EPDCCH) may include sending, from a base station, a first representation of the PRB blocks, the first representation including a plurality bits, a total number of the plurality of bits being less than a product of total number of the plurality of PRB pairs and a total number of the one or more sets, the first representation indicating which of the plurality of PRB pairs are in at least one of the one or more sets of one or more PRB pairs the UE is to monitor for the EPDCCH.

The first representation may include one or more logical bitmaps corresponding, respectively, to the one or more sets and, for each of the one or more logical bitmaps, the logical bitmap may be logically mapped to the plurality of PRB pairs such that the logical bitmap includes an entry for each of the plurality of PRB pairs except for one or more excluded PRB pairs from among the plurality of PRB pairs, and each entry in the logical bitmap may indicate whether or not the PRB pair to which the entry is logically mapped is one of the PRB pairs to be monitored for the EPDCCH by the UE.

The method may further include sending, from the base station, one or more logical bitmaps, the one or more logical bitmaps corresponding, respectively, to the one or more sets, the one or more logical bitmaps being logically mapped to the plurality of PRB pairs such that, for each of the one or more logical bitmaps, the logical bitmap includes entries only for the PRB pairs that are to be monitored for the EPDCCH by the UE, and each of the entries included in the logical bitmap indicates whether or not the PRB pair to which the entry is logically mapped is a member of the set corresponding to the logical bitmap.

The first representation may include one or more location indicators, the one or more location indicators may correspond, respectively, to the one or more sets, each of the one or more location indicators may include offset information and spacing information defining a pattern of PRB pairs within the plurality of PRB pairs and, for each of the one or more location indicators, the defined pattern may be logically mapped to the plurality of PRB pairs such that the defined pattern includes an entry for each of the plurality of PRB pairs except for one or more excluded PRB pairs from among the plurality of PRB pairs, and each entry in the defined first pattern may indicate whether or not the PRB pair to which the entry is logically mapped is one of the PRB pairs to be monitored for the EPDCCH by the UE.

The method may further include sending, from the base station, one or more second representations, each of the one or more second representations including offset information and spacing information defining a pattern of PRB pairs within the plurality of PRB pairs, the one or more second representations corresponding, respectively, to the one or more sets, the one or more second defined patterns being logically mapped to the plurality of PRB pairs such that, for each of the one or more second representations, the defined pattern of the second representation includes entries only for the PRB pairs that are to be monitored for the EPDCCH by the UE, and each of the entries included in the defined pattern of the second representation indicates whether or not the PRB pair to which the entry is logically mapped is a member of the set corresponding to the second representation.

According to at least one example embodiment, a method of determining one or more sets of one or more physical resource block (PRB) pairs from among a plurality PRB pairs in a subframe a user equipment (UE) is to monitor for the enhanced physical downlink control channel (EPDCCH) may include receiving, at the UE, a first representation of the plurality of PRB blocks, the first representation including a plurality bits, a total number of the plurality of bits being less than a product of a total number of the plurality of PRB pairs and a total number of the one or more sets, the first representation indicating which of the plurality of PRB pairs are in at least one of the one or more sets of one or more PRB pairs the UE is to monitor for the EPDCCH; and selecting one or more PRB pairs to monitor for the EPDCCH from among the plurality of PRB pairs based on the first representation.

The first representation may include one or more logical bitmaps corresponding, respectively, to the one or more sets and, for each of the one or more logical bitmaps, the logical bitmap may be logically mapped to the plurality of PRB pairs such that the logical bitmap includes an entry for each of the plurality of PRB pairs except for one or more excluded PRB pairs from among the plurality of PRB pairs, and each entry in the logical bitmap may indicate whether or not the PRB pair to which the entry is logically mapped is one of the PRB pairs to be monitored for the EPDCCH by the UE in the set corresponding to the logical bitmap.

The method may further include receiving, at the UE, one or more logical bitmaps, each of the one or more logical bitmaps corresponding, respectively, to the one or more sets, the one or more logical bitmaps being logically mapped to the plurality of PRB pairs such that, for each of the one or more logical bitmaps, the logical bitmap includes entries only for the PRB pairs that are to be monitored for the EPDCCH by the UE, and each of the entries included in the logical bitmap indicates whether or not the PRB pair to which the entry is logically mapped is a member of the set corresponding to the logical bitmap; and determining, for each of the one or more selected PRB pairs, which of the one or more sets the selected PRB pair belongs to based on the one or more logical bitmaps.

The first representation may include one or more location indicators, the one or more location indicators may correspond, respectively, to the one or more sets, each of the one or more location indicators may include offset information and first spacing information defining a pattern of PRB pairs within the plurality of PRB pairs and, for each of the one or more location indicators, the defined pattern may be logically mapped to the plurality of PRB pairs such that the defined pattern includes an entry for each of the plurality of PRB pairs except for one or more excluded PRB pairs from among the plurality of PRB pairs, and each entry in the defined pattern may indicate whether or not the PRB pair to which the entry is logically mapped is one of the PRB pairs to be monitored for the EPDCCH by the UE.

The method may further include receiving, at the UE, one or more second representations, each of the one or more second representations including offset information and spacing information defining a pattern of PRB pairs within the plurality of PRB pairs, the one or more second representations corresponding, respectively, to the one or more sets, the one or more defined patters being logically mapped to the plurality of PRB pairs such that, for each of the one or more second representations, the defined pattern of the second representation includes entries only for the PRB pairs that are to be monitored for the EPDCCH by the UE, and each of the entries included in the defined pattern of the second representation indicates whether or not the PRB pair to which the entry is logically mapped is a member of the set corresponding to the second representation; and determining, for each of the one or more selected PRB pairs, which of the one or more sets the selected PRB pair belongs to based on the one or more logical bitmaps.

According to at least one example embodiment, a network element may include a processing unit configured to control operations for specifying one or more sets of one or more physical resource block (PRB) pairs from among a plurality of PRB pairs in a subframe that a user equipment (UE) is to monitor for an enhanced physical downlink control channel (EPDCCH), the operations including, sending, from the network element, a first representation of the PRB blocks, the representation including a plurality bits, a total number of the plurality of bits being less than a product of total number of the plurality of PRB pairs and a total number of the one or more sets, the first representation indicating which of the plurality of PRB pairs are in at least one of the one or more sets of one or more PRB pairs the UE is to monitor for the EPDCCH.

According to at least one example embodiment, a mobile device may include a processing unit configured to control operations for determining one or more sets of one or more physical resource block (PRB) pairs from among a plurality PRB pairs in a subframe the mobile device is to monitor for the enhanced physical downlink control channel (EPDCCH), the operations including, receiving, at the mobile device, a first representation of the plurality of PRB blocks, the representation including a plurality bits, a total number of the plurality of bits being less than a product of a total number of the plurality of PRB pairs and a total number of the one or more sets, the first representation indicating which of the plurality of PRB pairs are in at least one of the one or more sets of one or more PRB pairs the mobile device is to monitor for the EPDCCH; selecting one or more PRB pairs to monitor for the EPDCCH from among the plurality of PRB pairs based on the first representation.

BRIEF DESCRIPTION OF THE DRAWINGS

At least one example embodiment will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Various at least one example embodiment will now be described more fully with reference to the accompanying drawings in which some example embodiments are shown.

Detailed illustrative embodiments are disclosed herein. However, specific structural and functional details disclosed herein are merely representative for purposes of describing at least one example embodiment. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile, mobile unit, mobile station, mobile user, access terminal (AT), subscriber, user, remote station, access terminal, receiver, etc., and may describe a remote user of wireless resources in a wireless communication network. The term enhanced Node B (eNB), may be considered synonymous to and/or referred to as a base station (BS), base transceiver station (BTS), NodeB, access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Network Architecture

Figure 1:
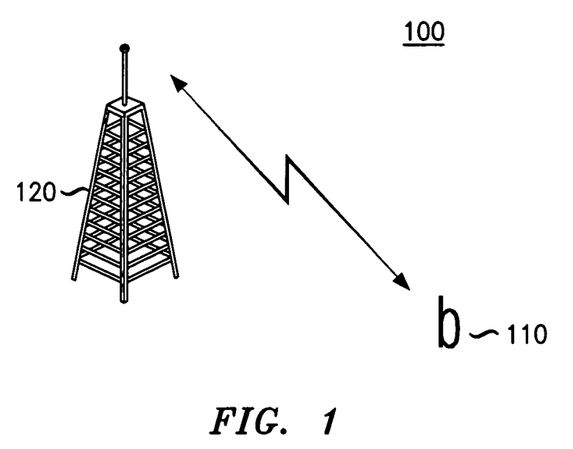
FIG. 1 is a diagram illustrating a portion of a wireless communications network.

FIG. 1 illustrates a portion of a wireless communication network 100. The wireless communication network 100 may follow, for example the long term evolution (LTE) protocol. The wireless communication network 100 may include a UE 110 and an evolved NodeB (eNB) 120. The eNB 120 may provide wireless coverage for the UE 110 within a cell or geographical region associated with the eNB 120. Accordingly, the eNB 120 and the UE 110 are both capable of transmitting and receiving data to and from one another, wirelessly. The UE 110 may be, for example, a mobile phone, smart phone, computer, or personal digital assistant (PDA). Further, wireless communications network 100 implements the Enhanced Physical Downlink Control Channel (EPD-CCH) as defined, for example, by technical specification 3GPP TS 36.211 V11.0.0. Accordingly the eNB 120 may send control data to the UE 110 using the EPDCCH. The eNB 120 and UE 110 will be discussed in greater detail below with reference to FIGS. 2A and 2B.

Though not pictured for simplicity, the wireless communications network 100 may include any number of additional eNBs and UEs. Further, the wireless communications network 100 may include other elements of an LTE core network including, for example, a mobility management entity (MME), a serving gateway (SGW), and a packet data network (PDN) gateway (PGW).

Figure 2A:
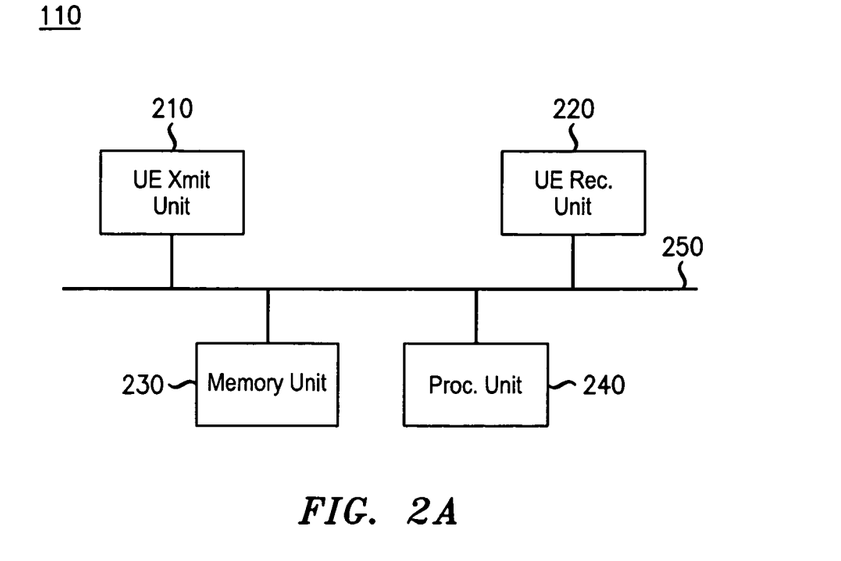
FIG. 2A is a diagram illustrating an example structure of the user equipment (UE) 110 illustrated in FIG. 1.

FIG. 2A is a diagram illustrating an example structure of the UE 110 illustrated in FIG. 1. While only the UE 110 is shown, it should be understood that other UEs in the wireless communications network 100 may have the same structure.

The UE 110 may include, for example, a UE transmitting unit 210, a UE receiving unit 220, a memory unit 230, a processing unit 240, and a data bus 250.

The UE transmitting unit 210, UE receiving unit 220, memory unit 230, and processing unit 240 may send data to and/or receive data from one another using the data bus 250. The UE transmitting unit 210 is a device that includes hardware and any necessary software for transmitting wireless signals on an uplink (reverse link) channel including, for example, data signals or control signals, via one or more wireless connections to other wireless devices (e.g., eNBs).

The UE receiving unit 220 is a device that includes hardware and any necessary software for receiving wireless signals on a downlink (forward link) channel including, for example, data signals or control signals, via one or more wireless connections to other wireless devices (e.g., eNBs).

The memory unit 230 may be any storage medium capable of storing data including magnetic storage, flash storage, etc.

The processing unit 240 may be any device capable of processing data including, for example, a microprocessor configured to carry out specific operations based on input data, or capable of executing instructions included in computer readable code including, for example code stored in the memory unit 230.

According to at least one example embodiment, operations described herein as being performed by a UE may be performed by the UE 110 having the structure illustrated in FIG. 2A. For example, the memory unit 230 may store executable instructions corresponding to each of the operations described with reference to FIGS. 3-6 as being performed by a UE. Further, the processing unit 240 may be configured perform each of the operations described with reference to FIGS. 3-6 as being performed by a UE, for example, by executing executable instructions stored in the memory unit 230.

Figure 2B:
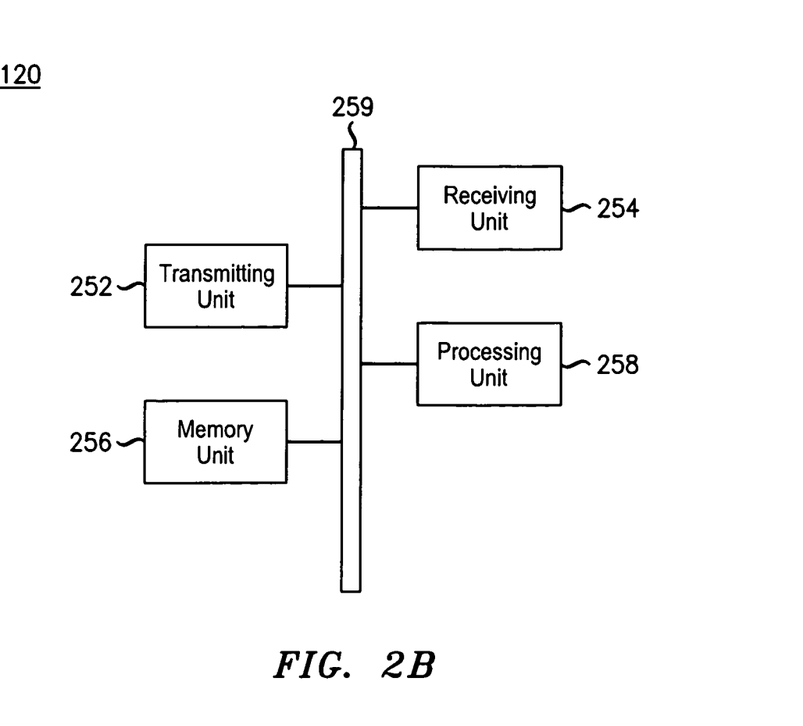
FIG. 2B is a diagram illustrating an example structure of the evolved node B (eNB) 120 illustrated in FIG. 1.

FIG. 2B is a diagram illustrating an example structure of the eNB 120. Referring to FIG. 2B, the eNB 120 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to other network elements in communications network 105. For example, the transmitting unit 252 may be configured to send control signals to UEs within wireless communications network 100 over the EPDCCH. As another example, the transmitting unit 252 may be additionally configured to send control signals to UEs within wireless communications network 100 using broadcast or dedicated radio resource control (RRC) signaling.

The receiving unit 254 is a device that includes hardware and any necessary software for receiving wireless signals including, for example, control signals or data signals via one or more wired and/or wireless connections to other network elements in the communications network 105.

The memory unit 256 may be any device capable of storing data including magnetic storage, flash storage, etc.

The processing unit 258 may be any device capable of processing data including, for example, a microprocessor configured to carry out specific operations based on input data, or capable of executing instructions included in computer readable code including, for example code stored in the memory unit 256.

According to at least one example embodiment, operations described herein as being performed by an eNB may be performed by the eNB 120 having the structure illustrated in FIG. 2B. For example, the memory unit 256 may store executable instructions corresponding to each of the operations described with reference to FIGS. 3-6 as being performed by an eNB. Further, the processing unit 258 may be configured perform each of the operations described with reference to FIGS. 3-6 as being performed by a eNB, for example, by executing executable instructions stored in the memory unit 256.

Method of Indicating which PRBS to Monitor for EPDCCH

As is discussed above, the eNB 120 sends control data to the UE 110 using the EPDCCH.

Signaling is needed to indicate to the User Equipment (UE) which PRB pairs to monitor to see if they contain EPDCCH. It may be advantageous to scatter the PRB pairs for EPDCCH across the system bandwidth as much as possible in order to enable frequency-selective scheduling to select the sub-bands which offer best performance, or to achieve frequency diversity gain with distributed transmissions.

It may also be advantageous to allow as much flexibility as possible to the eNB to choose which of the monitored PRB pairs to use for actual EPDCCH transmission, in order to fit with other constraints such as scheduling of data channels in some PRB pairs, and inter-cell interference coordination/avoidance.

Some PRB pairs may not be available for EPDCCH transmission due to their use for other signals, such as physical broadcast channel (PBCH), Primary synchronization signal (PSS) and secondary synchronization signal (SSS).

All these factors together result in a complex set of constraints for the indication of PRB pairs for EPDCCH monitoring. Signaling is needed to indicate the PRB pairs to be monitored by the UE in an efficient (i.e. low overhead) way with a high degree of flexibility.

One method for indicating to the UEs which PRB pairs to perform EPDCCH monitoring on includes transmitting a bitmap with one bit per PRB pair indicating whether each PRB pair is to be monitored for the EPDCCH. However, the above-referenced method may result in require signaling which includes an undesirable amount of overhead. Further, the above-referenced method does not exploit the knowledge of certain PRB pairs which cannot be used for the EPDCCH.

Additionally, there may be a need to perform EPDCCH monitoring on K different sets ("EPDCCH sets") of N PRB pairs, where K and N are positive integers, and where N may take a different value in each of the K sets. Multiple EPDCCH sets may be accommodated with the use of multiple bitmaps. The sending of multiple bitmaps, each of which may include a number of entries equal to a total number of PRB pairs in a subframe, from the eNB 120 to the UE 110, for example, may result in a substantial amount of signaling overhead for the wireless communications system 100.

Accordingly, it would be desirable to implement a method of indicating to a UE which PRB pairs to perform EPDCCH monitoring on which requires less data to be sent from, for example, the eNB 120 to the UE 110. A method of indicating which PRB pairs to perform EPDCCH monitoring on will now be discussed in greater detail below.

According to at least one example embodiment, a method is provided for indicating to a UE at least one set of PRB pairs to monitor for reception of the EPDCCH in a subframe, wherein the number of bits used for the signaling per set of resource blocks is less than the maximum number of resource blocks in the subframe.

In one embodiment, the signaling relates to a logical set of resource blocks which excludes certain physical resource blocks that are known a priori (e.g. via other longer term signaling or predefined rules) to be unavailable for EPDCCH.

Figure 3:
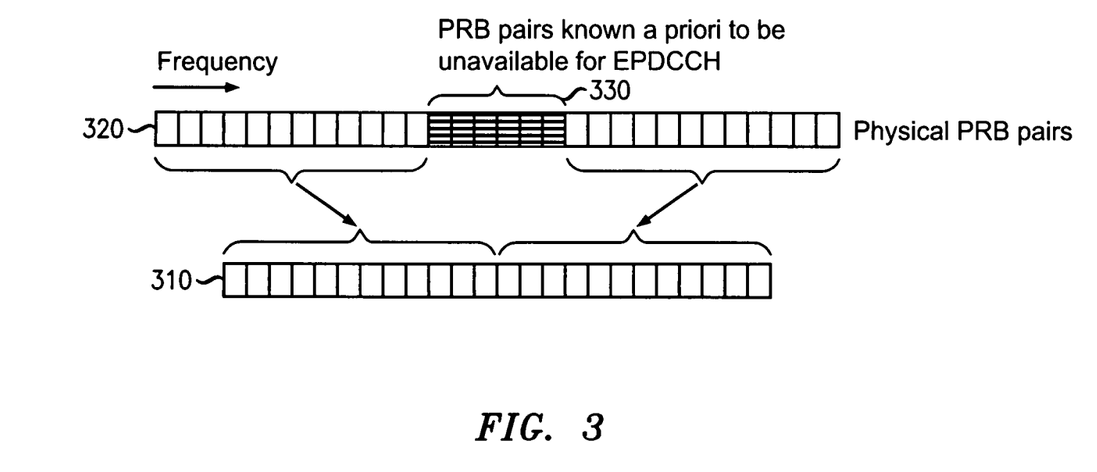
FIG. 3 is a diagram explaining a method of identifying PRB blocks upon which to perform EPDCCH monitoring in accordance with at least one example embodiment.

FIG. 3 is a diagram explaining a method of identifying PRB blocks upon which to perform EPDCCH monitoring in accordance with at least one example embodiment. Referring to FIG. 3, an eNB may generate a first logical bitmap 310 corresponding to a physical set of PRB pairs, first PRB pairs 320, where at least some of the first PRB pairs 320 are not represented in the first logical bitmap 310. The logical bitmap may be sent from an eNB to a UE using, for example, radio resource (RRC) signaling. The first PRB pairs 320 may be PRB pairs in a subframe being sent from an eNB, for example the eNB 120, to a UE, for example the UE 110.

As is illustrated in FIG. 3, the first PRB pairs 320 include non-EPDCCH PRB pairs 330. Non-EPDCCH PRB pairs 330 are PRB pairs which are known, by the eNB sending the first PRB pairs 320 and the UE receiving the PRB pairs 320, as not being intended to provide the EPDCCH to the UE. For example, the non-EPDCCH PRB pairs may be PRB pairs which are defined by a rule known to both the eNB and the UE as not being intended to provide the EPDCCH to the UE. Such a rule may be set, for example, in accordance with an operator of the wireless network 100 or defined by a technical standard the wireless network 100 adheres to. As another example, an eNB may send a signal to the UE identifying certain PRB pairs as non-EPDCCH PRB pairs.

Accordingly, the eNB creates the first logical bitmap 310 such that the first logical bitmap 310 is logically mapped to each of the PRB pairs included in the first PRB pairs 320 except for the non-EPDCCH PRB pairs 330. Consequently, the first logical bitmap 310 does not include any entries corresponding to the non-EPDCCH pairs, and thus, a total number of entries in the first logical bitmap 310 is less than a total number of PRB pairs included in the first PRB pairs 320. Accordingly, less overhead is created when sending the logical bitmap 310 from an eNB to a UE when compared to a situation where the eNB sends a bitmap having a number of entries equal to the total number of PRB pairs in the first PRB pairs 320.

With respect to the PRB pairs, from among the first PRB pairs 320, which are logically mapped to the first logical bitmap 310, the first logical bitmap 310 indicates which PRB pairs should be monitored for the EPDCCH. For example, the first logical bitmap 310 may include a "1" for each PRB pair upon which the UE should perform an EPDCCH monitoring operation, and the first logical bitmap 310 may include a "0" for each PRB pair upon which the UE should not perform an EPDCCH monitoring operation. Because, as is discussed above, the first logical bitmap 310 does not include entries corresponding to each PRB pair in the first PRB pairs 320, an amount of signaling overhead created when an eNB sends the first logical bitmap 310 to a UE may be reduced with respect to a scenario in which a bitmap is sent which includes entries for every PRB pair in the first PRB pairs 320.

Because, as is discussed above, the first logical bitmap 310 does not include entries corresponding to each PRB pair in the first PRB pairs 320, an amount of signaling overhead created when an eNB sends the first logical bitmap 310 to a UE may be reduced with respect to a scenario in which a bitmap is sent which includes entries for every PRB pair in the first PRB pairs 320. For example, in the example illustrated in FIG. 3, a total number of the first PRB pairs 320 is 30 PRB pairs and a total number of the non-EPDCCH PRB pairs is 6. Accordingly, the first logical bitmap may include only 24 bits, as opposed to 30.

Once a UE receives the first logical bitmap 310, the UE may use the first logical bitmap 310 along with knowledge of the non-EPDCCH PRB pairs to determine which PRB pairs to monitor for the EPDCCH, and which PRB pairs not to monitor for the EPDCCH. For example, in a case where the eNB 120 generates the first logical bitmap 310 and sends the first logical bitmap 310 to the UE 110, according to at least one example embodiment, the UE 110 performs EPDCCH monitoring on each of the first PRB pairs 320 which logically maps to a "1" in the first logical bitmap 310, and the UE 110 does not perform EPDCCH monitoring on any of the first PRB pairs 320 received from the eNB 120 which logically map to a "0" in the first logical bitmap 310. Further, the UE 110 does not perform EPDCCH monitoring on any of the non-EPDCCH PRB pairs 330.

Though only one logical bitmap, first logical bitmap 310, is illustrated in FIG. 3 as identifying PRB pairs from among the first PRB pairs 320 which should be monitored for the EPDCCH, according to at least one example embodiment, the eNB may send a plurality of bitmaps, including the first logical bitmap 310 and one or more additional logical bitmaps structured in the same manner as the first logical bitmap 310, to the UE. Each of the plurality of logical bitmaps may correspond to a different one of a plurality of EPDCCH sets. Further, since each of the plurality of logical bitmaps may exclude entries for at least some of the first plurality of PRB pairs 320, a total number of bits for the plurality of logical bitmaps may be less than a product of a total number of PRB pairs in the first PRB pairs 320 and a total number of the EPDCCH sets for which a logical bitmap is sent. Accordingly, by consulting the plurality of logical bitmaps, the UE will be able to determine which PRB pairs need to be monitored for the EPDCCH and the EPDCCH set or sets each of the PRB pairs belongs to. EPDCCH sets are discussed in greater detail below with respect to FIG. 4.

Figure 4:
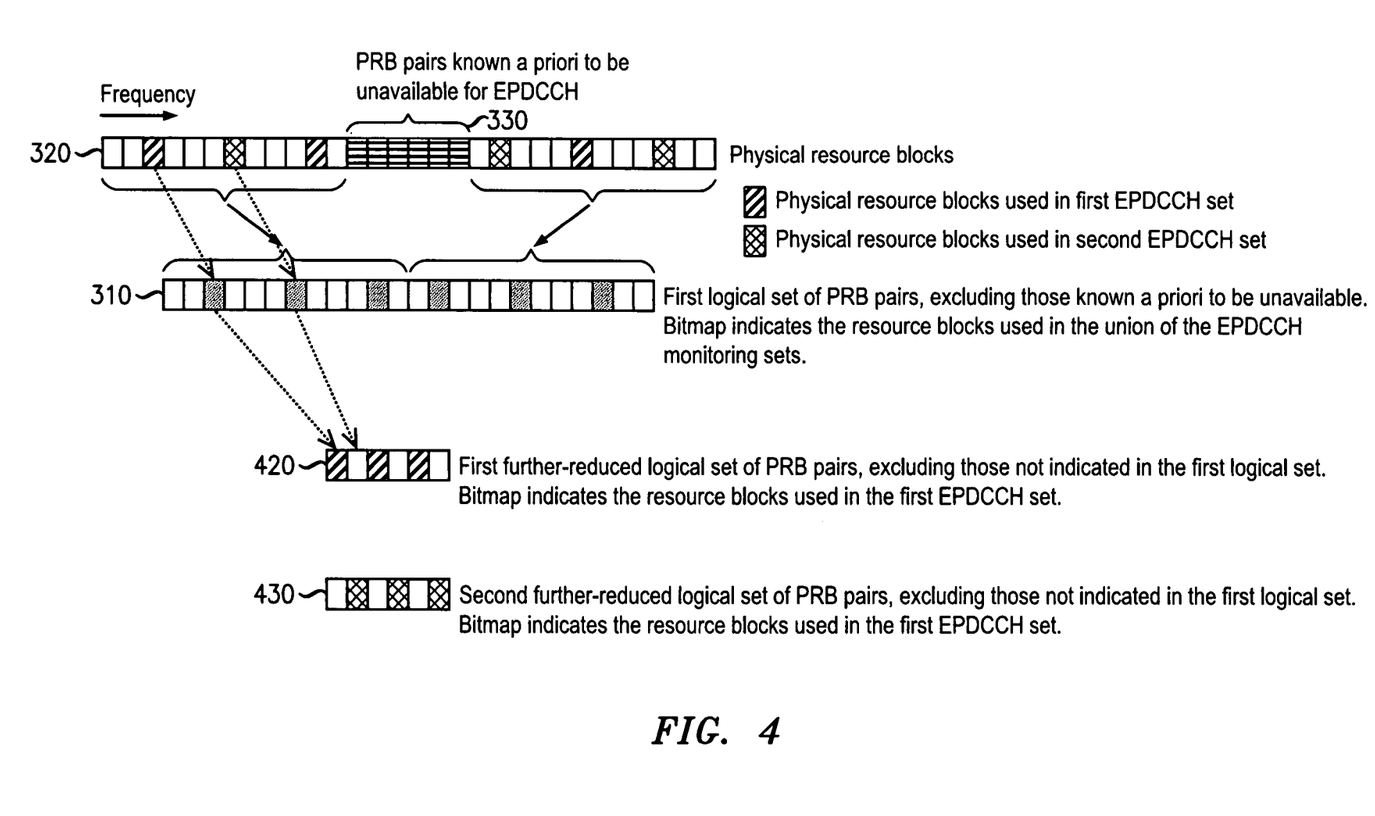
FIG. 4 is a diagram explaining a method of identifying PRB blocks upon which to perform EPDCCH monitoring in accordance with at least one example embodiment.

According to at least one example embodiment, reduced logical bitmaps may be provided to a UE which allow the UE to distinguish different sets of EPDCCH PRB pairs. FIG. 4 is a diagram explaining a method of identifying PRB blocks upon which to perform EPDCCH monitoring in accordance with at least one example embodiment. Referring to FIG. 4, in the same manner discussed above with reference to FIG. 3, an eNB may generate a first logical bitmap 310 corresponding to a physical set of PRB pairs, first PRB pairs 320, where non-EPDCCH PRB pairs 330 are not represented in the first logical bitmap 310. However, in addition to generating the first logical bitmap 310, in the example illustrated in FIG. 4, the eNB also generates third and fourth logical bitmaps 420 and 430 in order to allow the UE to determine, not only which PRB pairs to perform EPDCCH monitoring for, but also which EPDCCH set each PRB pair belongs to. As will be discussed in greater detail below, third and fourth logical bitmaps 420 and 430 are reduced logical bitmaps which may include fewer bits than the first logical bitmap 310.

For example, PRB pairs that are intended to be monitored by the UE for the EPDCCH may belong to one or more different sets. In the example illustrated in FIG. 4, some of the PRB pairs from among the first PRB pairs 320 belong to a first EPDCCH set (illustrated in FIG. 4 as boxes containing a pattern of upward diagonal lines within the first PRB pairs 320); and some of the PRB pairs from among the first PRB pairs 320 belong to a second EPDCCH set (illustrated in FIG. 4 as boxes containing a diamond pattern within the first PRB pairs 320). PRB pairs may be divided into different EPDCCH sets in accordance with the preference of an operator of the wireless network. As one example, PRB pairs in the first EPDCCH set may be associated with distributed transmission, and PRB pairs in the second EPDCCH set may be associated with localized transmission. It may be desirable for a UE to handle EPDCCH PRB pairs of different EPDCCH sets in different manners. With the use of second and third logical bitmaps 420 and 430, a UE will know which EPDCCH set a PRB pair belongs to. The manner in which the second and third logical bitmaps 420 and 430 are generated by an eNB and used by a UE will now be discussed in greater detail below.

As is discussed above with reference to FIG. 3, the logical bitmap 310 is a representation of the first PRB pairs 320 which excludes the non-EPDCCH PRB pairs 330, and identifies PRB pairs that are to be monitored by the UE. In the example illustrated in FIG. 4, the PRB pairs within the logical bitmap 310 which are to be monitored by the UE are represented by shaded squares. Further, as is illustrated in FIG. 4, each of PRB pairs of the first EPDCCH set and the second EPDCCH set in the first PRB pairs 320 are logically mapped to a corresponding entry in the logical bitmap 310. Thus, for example, the logical bitmap 310 may include a "1" for each entry in the logical bitmap 310 which is logically mapped to a PRB pair within the first PRB pairs 320, where the PRB pair is included in either the first EPDCCH set or the second EPDCCH set; and the logical bitmap 310 may include a "0" for each entry in the logical bitmap 310 which is not logically mapped to a PRB block included in either the first EPDCCH set or the second EPDCCH set.

The eNB may generate the second logical bitmap 420 such that the second logical bitmap 420 is mapped only to the PRB pairs from among the first PRB pairs 320 which are included in ether the first EPDCCH set or the second EPDCCH set. Accordingly a total number of entries in the second logical bitmap 420 may be equal to a total number of unique PRB pairs which are in any one of the first EPDCCH set and the second EPDCCH set. In the example illustrated in FIG. 4, there are 3 PRB pairs in the first EPDCCH set and 3 PRB pairs in the second EPDCCH set. Accordingly, a total number of unique PRB pairs which are in any one of the first EPDCCH set or the second EPDCCH set is 3+3=6. Consequently, in the example illustrated in FIG. 4, a total number of entries in the second logical bitmap 420 is 6. Further, the second logical bitmap 420 identifies PRB pairs belonging to the first EPDCCH set. For example, the second logical bitmap 420 may include a "1" for each entry in the second logical bitmap 420 which is logically mapped to a PRB block included in the first EPDCCH set; and the second logical bitmap 420 may include a "0" for each entry in the second logical bitmap 420 which is logically mapped to a PRB block not included in the first EPDCCH set.

Similarly, the eNB may generate the third logical bitmap 430 such that the third logical bitmap 430 is mapped only to the PRB pairs from among the first PRB pairs 320 which are included in ether the first EPDCCH set or the second EPDCCH set. Accordingly, like the second logical bitmap 420, a total number of entries in the third logical bitmap 430 may be equal to a total number of unique PRB pairs which are in any one of the first EPDCCH set and the second EPDCCH set. Consequently, in the example illustrated in FIG. 4, a total number of entries in the third logical bitmap 430 is 6. Further, the third logical bitmap 430 identifies PRB pairs belonging to the second EPDCCH set. For example, the third logical bitmap 430 may include a "1" for each entry in the third logical bitmap 430 which is logically mapped to a PRB block included in the second EPDCCH set; and the third logical bitmap 430 may include a "0" for each entry in the second logical bitmap 420 which is logically mapped to a PRB block not included in the second EPDCCH set.

The eNB may send each of the first, second and third bitmaps 310, 420 and 430 to the UE. By consulting the first bitmap 310, the UE may determine which PRB pairs to perform EPDCCH monitoring on. Further, by consulting the second bit map 420 and the third bitmap 430 in addition to the first bitmap 310, the UE can determine, for each PRB pair upon which EPDCCH monitoring is to be performed, which EPDCCH set the PRB pair belongs to. For example, the UE 110 may determine each of the first PRB pairs 320 that logically maps to a "1" in the first logical bitmap 310 and logically maps to a "1" in the second logical bitmap 420 to be a member of the first EPDCCH set. Further, the UE 110 may determine each of the first PRB pairs 320 that logically maps to a "1" in the first logical bitmap 310 and logically maps to a "1" in the third logical bitmap 430 to be a member of the second EPDCCH set.

Figure 5:
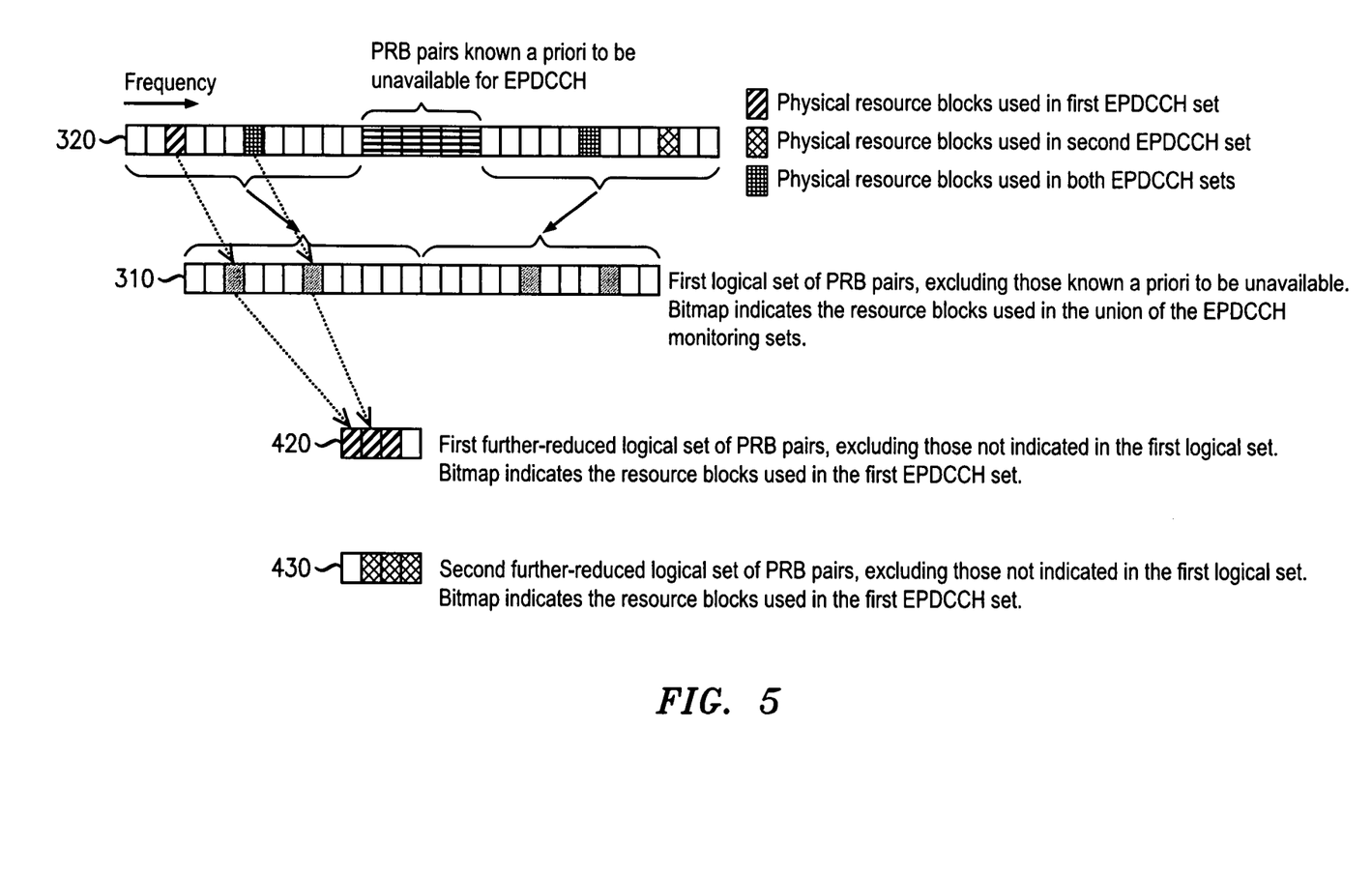
FIG. 5 is a diagram explaining a method of identifying PRB blocks upon which to perform EPDCCH monitoring in accordance with at least one example embodiment.

In the example illustrated in FIG. 4, no PRB pair belongs to more than one EPDCCH set. However, as will now be discussed below with reference to FIG. 5, according to at least one example embodiment, a PRB pair may belong to multiple sets. FIG. 5 is a diagram explaining a method of identifying PRB blocks upon which to perform EPDCCH monitoring in accordance with at least one example embodiment.

Referring to FIG. 5, in the same manner discussed above with reference to FIG. 4, an eNB may generate a first logical bitmap 310 corresponding to the first PRB pairs 320. The non-EPDCCH PRB pairs 330 are not represented in the first logical bitmap 310 and the first logical bit map 310 identifies PRB pairs which are to be monitored by the UE (illustrated in FIG. 5 as shaded squares within the first logical bitmap 310). Further, in the same manner discussed above with reference to FIG. 4, the eNB may generate first and second logical bitmaps 420 and 430 identifying which PRB pairs belong to the first EPDCCH set and which PRB pairs belong to the second EPDCCH set. However, in the example illustrated in FIG. 5, some of the PRB pairs from among the first PRB pairs 320 belong to the first EPDCCH set (illustrated in FIG. 5 as a boxes containing a pattern of upward diagonal lines within the first PRB pairs 320); some of the PRB pairs from among the first PRB pairs 320 belong to the second EPDCCH set (illustrated in FIG. 5 as a boxes containing a diamond pattern within the first PRB pairs 320); and some of the PRB pairs from among the first PRB pairs 320 belong to both the first and second EPDCCH set (illustrated in FIG. 5 as a boxes containing an '+' within the first PRB pairs 320).

In the example illustrated in FIG. 5, 1 PRB pair belongs only to the first EPDCCH set, 1 PRB pair belongs only to the second EPDCCH set, and 2 PRB pairs belong to both the first and second EPDCCH sets. Accordingly, because, as is discussed above with reference to FIG. 4, a total number of entries in the second logical bit map 420 and a total number of entries in the third logical bitmap 430 are both equal to a total number of unique PRB pairs which belong to any one of the first and second EPDCCH sets, the eNB form's both the second and third logical bitmaps 420 and 430 to include 4 entries.

Once the eNB sends each of the first, second and third bitmaps 310, 420 and 430 to the UE, the UE can determine which PRB pairs to perform EPDCCH monitoring on. Further, for each PRB pair upon which EPDCCH monitoring is to be performed, the UE may determine which EPDCCH set the PRB pair belongs to. For example, the UE 110 may determine each of the first PRB pairs 320 which logically maps to a "1" in the first logical bitmap 310 and logically maps to a "1" in the second logical bitmap 420 to be a member of the first EPDCCH set. Further, the UE 110 may determine each of the first PRB pairs 320 which logically maps to a "1" in the first logical bitmap 310 and logically maps to a "1" in the third logical bitmap 430 to be a member of the second EPDCCH set. Additionally, the UE 110 may determine each of the first PRB pairs 320 which logically maps to a "1" in the first logical bitmap 310, logically maps to a "1" in the second logical bitmap 420, and logically maps to a "1" in the third logical bitmap 430 to be a member of both the first and the second EPDCCH sets.

Though in the examples illustrated in FIGS. 4 and 5, only a first EPDCCH set and a second EPDCCH set are discussed, any number of EPDCCH sets can be configured and each EPDCCH set consists of one or multiple PRB pairs. Further, for each of the EPDCCH sets, a bitmap corresponding to the EPDCCH set may be generated by the eNB, sent from the eNB to the UE, and interpreted by the UE in the same manner discussed above with reference to the second and third logical bitmaps 420 and 430 illustrated in FIGS. 4 and 5.

Further, in the examples illustrated in FIGS. 4 and 5, information regarding which PRB pairs the UE should monitor and information identifying which of the first and second EPDCCH sets each PRB pair to be monitored belongs to can both be provided from the eNB to the UE without the need to send 3 full bitmaps. For example, in the example illustrated in FIG. 4 a total number of the first PRB pairs 320 is 30 PRB pairs, and a total number of the non-EPDCCH PRB pairs is 6. Accordingly, the first logical bitmap 310 may include only 24 bits, as opposed to 30. Further each of the second and third logical bitmaps 420 and 430 may include only 6 entries as opposed to 30. Accordingly, a total number of bits included in the first second and third bitmaps 310, 420 and 430 is 24+6+6=36, which is substantially less than the 30+30+30=-90 bits which would be needed to send 3 bitmaps each having a number of entries equal to a total number of PRB pairs in the first PRB pairs 320. Further, in the example illustrated in FIG. 5 a total number of the first PRB pairs 320 is 30 PRB pairs, and a total number of the non-EPDCCH PRB pairs is 6. Accordingly, the first logical bitmap 310 may include only 24 bits, as opposed to 30. Further each of the second and third logical bitmaps 420 and 430 may include only 4 entries as opposed to 30. Accordingly, a total number of bits included in the first second and third bitmaps 310, 420 and 430 is 24+4+4=32, which is substantially less than the 30+30+30=90 bits which would be needed to send 3 bitmaps each having a number of entries equal to a total number of PRB pairs in the first PRB pairs 320. Accordingly, using the methods discussed above with reference to FIGS. 4 and 5, an amount of overhead generated by the eNB when conveying, to the UE, information regarding the PRB pairs which are to be monitored by the UE and information identifying the EPDCCH set each of the PRB pairs to be monitored belongs to may be reduced.

In accordance with at least one example embodiment, the signaling overhead generated by the eNB may be further reduced, in comparison with the examples discussed above with reference to FIGS. 3-5, by way of a rule specifying that the PRBs in a given EPDCCH set are equally spaced, and thus, PRB pairs belonging to the EPDCCH set can be indicated to a UE by an eNB by sending information indicating a spacing and an offset from the eNB to the UE, rather than sending a bitmap. However, a complication in this case is how to handle the resource blocks, like the non-EPDCCH blocks 330, which are known a priori to be unavailable for EPDCCH. In order to address the above-referenced complication, as will be discussed in greater detail below with reference to FIG. 6, in accordance with at least one example embodiment, the spacing and offset may be applied in the logical domain rather than the physical domain.

Figure 6:
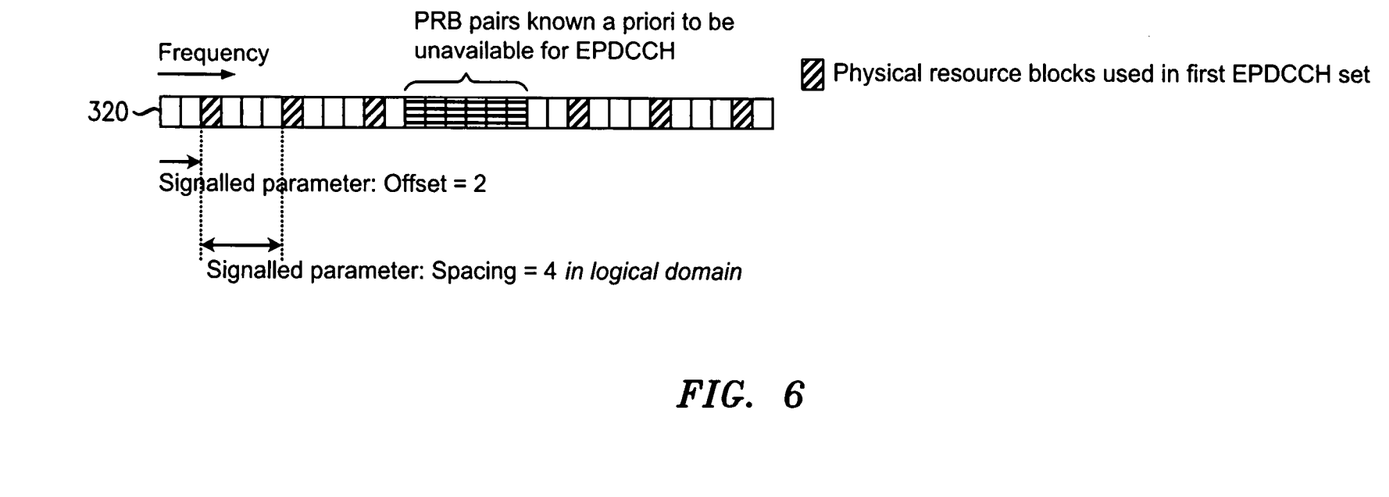
FIG. 6 is a diagram explaining a method of identifying PRB blocks upon which to perform EPDCCH monitoring using spacing and offset signaling in accordance with at least one example embodiment.

FIG. 6 is a diagram explaining a method of identifying PRB blocks upon which to perform EPDCCH monitoring using spacing+offset signaling in accordance with at least one example embodiment. In the example illustrated in FIG. 6, PRB pairs, from among the first PRB pairs 320, which are to be monitored by the UE and are included in the first EPDCCH set (illustrated in FIG. 5 as a boxes containing a pattern of upward diagonal lines within the first PRB pairs 320) have a uniform spacing with respect to one another when disregarding the non-EPDCCH PRB pairs 330. Specifically, in the example illustrated in FIG. 6, when disregarding the non-EPDCCH PRB pairs 330, two PRB pairs exist in between the beginning of the first PRB pairs 320 and an initial one of the PRB pairs belonging to the first EPDCCH set, and each subsequent PRB pair in the first EPDCCH set occurs at an interval of 4 PRB pairs. Accordingly, the pattern of PRB pairs in the first EPDCCH set may be represented, simply, by an offset value of 2 and spacing value of 4. The offset and spacing information may be sent from the eNB to the UE by using, for example, RRC signaling. The UE may use the offset information, the spacing information, and information regarding the non-EPDCCH PRB pairs 330 to determine which PRB pairs, from among the PRB pairs 320, to perform EPDCCH monitoring on.

Accordingly, if a number of bits required to send the offset and spacing information is less than a total number of PRB pairs in the first PRB pairs 320, the method discussed above with reference to FIG. 6 may reduce an amount of overhead generated by the eNB when conveying information regarding the PRB pairs that should be monitored by the UE in comparison to a case where a bitmap having a number of entries equal to a total number of PRB pairs in the first PRB pairs 320 is sent from the eNB to the UE. Further, if a number of bits required to send the offset and spacing information is less than a total number bits required to send first, second and/or third bitmaps 310, 420 and 430 in the examples discussed above with reference to FIGS. 3-5, the method discussed above with reference to FIG. 6 may further reduce an amount of overhead generated by the eNB in comparison to the methods described above with reference to FIGS. 3-5. Consequently, referring to the method discussed above with reference to FIG. 6, a benefit is provided whereby the efficiency (low overhead) of the spacing+offset signaling method is not compromised by the existence of certain resource blocks which are a priori not available for EPDCCH sets. Though the method described above with reference to FIG. 6 is described with respect to an example where only PRB pairs of one EPDCCH set are identified using offset and spacing information, the spacing+offset signaling method may be used for any number of EPDCCH sets. Further, according to at least some embodiments, in the, the spacing+offset signaling method may be used in place of any or all of the logical bitmaps described above with reference to FIGS. 3, 4 and 5, including the first, second and third bitmaps 310, 420 and 430. Example embodiments being thus described, it will be obvious that embodiments may be varied in many ways. Such variations are not to be regarded as a departure from example embodiments, and all such modifications are intended to be included within the scope of example embodiments.

What is claimed:

1. A method of specifying, from among a plurality of physical resource block (PRB) pairs in a subframe, one or more sets of one or more PRB pairs that a user equipment (UE) is to monitor for an enhanced physical downlink control channel (EPDCCH), the method comprising:
   sending, from a base station, a first representation of the plurality of PRB pairs, the representation including a plurality of bits, a total number of the plurality of bits being less than a product of a total number of the plurality of PRB pairs and a total number of the one or more sets, the first representation indicating which of the plurality of PRB pairs are in at least one of the one or more sets of one or more PRB pairs the UE is to monitor for the EPDCCH,
   the first representation including one or more entries corresponding to each of the plurality of PRB pairs except one or more excluded PRB pairs from among the plurality of PRB pairs,
   the first representation including no entries corresponding to the one or more excluded PRB pairs,
   the one or more excluded PRB pairs being PRB pairs of the subframe which are defined as not being available for providing the EPDCCH.

2. The method of claim 1, wherein the first representation includes one or more logical bitmaps corresponding, respectively, to the one or more sets and, for each of the one or more logical bitmaps,
   the logical bitmap is logically mapped to the plurality of PRB pairs such that the logical bitmap includes an entry for each of the plurality of PRB pairs except for one or more excluded PRB pairs from among the plurality of PRB pairs, and each entry in the logical bitmap indicates whether or not the PRB pair to which the entry is logically mapped is one of the PRB pairs to be monitored for the EPDCCH by the UE in the set corresponding to the logical bitmap.

3. The method of claim 1, further comprising:
   sending, from the base station, one or more logical bitmaps, the one or more logical bitmaps corresponding, respectively, to the one or more sets, the one or more logical bitmaps being logically mapped to the plurality of PRB pairs such that, for each of the one or more logical bitmaps,
   the logical bitmap includes entries only for the PRB pairs that are to be monitored for the EPDCCH by the UE, and
   each of the entries included in the logical bitmap indicates whether or not the PRB pair to which the entry is logically mapped is a member of the set corresponding to the logical bitmap.

4. The method of claim 1, wherein the first representation includes one or more location indicators, the one or more location indicators correspond, respectively, to the one or more sets, each of the one or more location indicators includes first offset information and first spacing information defining a first pattern of PRB pairs within the plurality of PRB pairs and, for each of the one or more location indicators,
   the defined first pattern is logically mapped to the plurality of PRB pairs such that the defined first pattern includes an entry for each of the plurality of PRB pairs except for one or more excluded PRB pairs from among the plurality of PRB pairs, and each entry in the defined first pattern indicates whether or not the PRB pair to which the entry is logically mapped is one of the PRB pairs to be monitored for the EPDCCH by the UE.

5. The method of claim 1, further comprising:
sending, from the base station, one or more second representations, each of the one or more second representations including offset information and spacing information defining a pattern of PRB pairs within the plurality of PRB pairs, the one or more second representations corresponding, respectively, to the one or more sets, the one or more defined patterns being logically mapped to the plurality of PRB pairs such that, for each of the one or more second representations,
the defined pattern of the second representation includes entries only for the PRB pairs that are to be monitored for the EPDCCH by the UE, and
each of the entries included in the defined pattern of the second representation indicates whether or not the PRB pair to which the entry is logically mapped is a member of the set corresponding to the second representation.

6. A method of determining, from among a plurality of physical resource block (PRB) pairs in a subframe, one or more sets of one or more PRB pairs a user equipment (UE) is to monitor for an enhanced physical downlink control channel (EPDCCH), the method comprising:
receiving, at the UE, a first representation of the plurality of PRB pairs, the representation including a plurality of bits, a total number of the plurality of bits being less than a product of a total number of the plurality of PRB pairs and a total number of the one or more sets, the first representation indicating which of the plurality of PRB pairs are in at least one of the one or more sets of one or more PRB pairs the UE is to monitor for the EPDCCH; and
selecting one or more PRB pairs to monitor for the EPDCCH from among the plurality of PRB pairs based on the first representation,
the first representation including one or more entries corresponding to each of the plurality of PRB pairs except one or more excluded PRB pairs from among the plurality of PRB pairs,
the first representation including no entries corresponding to the one or more excluded PRB pairs,
the one or more excluded PRB pairs being PRB pairs of the subframe which are defined as not being available for providing the EPDCCH.

7. The method of claim 6, wherein the first representation includes one or more logical bitmaps corresponding, respectively, to the one or more sets and, for each of the one or more logical bitmaps,
the logical bitmap is logically mapped to the plurality of PRB pairs such that the logical bitmap includes an entry for each of the plurality of PRB pairs except for one or more excluded PRB pairs from among the plurality of PRB pairs, and each entry in the logical bitmap indicates whether or not the PRB pair to which the entry is logically mapped is one of the PRB pairs to be monitored for the EPDCCH by the UE.

8. The method of claim 6, further comprising:
receiving, at the UE, one or more logical bitmaps, each of the one or more logical bitmaps corresponding, respectively, to the one or more sets, the one or more second logical bitmaps being logically mapped to the plurality of PRB pairs such that, for each of the one or more logical bitmaps,
the logical bitmap includes entries only for the PRB pairs that are to be monitored for the EPDCCH by the UE, and
each of the entries included in the logical bitmap indicates whether or not the PRB pair to which the entry is logically mapped is a member of the set corresponding to the logical bitmap; and
determining, for each of the one or more selected PRB pairs, which of the one or more sets the selected PRB pair belongs to based on the one or more second logical bitmaps.

9. The method of claim 6, wherein the first representation includes one or more location indicators, the one or more location indicators correspond, respectively, to the one or more sets, each of the one or more location indicators includes offset information and spacing information defining a pattern of PRB pairs within the plurality of PRB pairs and, for each of the one or more location indicators,
the defined pattern is logically mapped to the plurality of PRB pairs such that the defined pattern includes an entry for each of the plurality of PRB pairs except for one or more excluded PRB pairs from among the plurality of PRB pairs, and each entry in the defined first pattern indicates whether or not the PRB pair to which the entry is logically mapped is one of the PRB pairs to be monitored for the EPDCCH by the UE.

10. The method of claim 6, further comprising:
receiving, at the UE, one or more second representations, each of the one or more second representations including offset information and spacing information defining a pattern of PRB pairs within the plurality of PRB pairs, the one or more second representations corresponding, respectively, to the one or more sets, the one or more second defined patters being logically mapped to the plurality of PRB pairs such that, for each of the one or more second representations,
the defined pattern of the second representation includes entries only for the PRB pairs that are to be monitored for the EPDCCH by the UE, and
each of the entries included in the defined pattern of the second representation indicates whether or not the PRB pair to which the entry is logically mapped is a member of the set corresponding to the second representation; and
determining, for each of the one or more selected PRB pairs, which of the one or more sets the selected PRB pair belongs to based on the one or more second representations.

11. A network element comprising:
a processing unit configured to control operations for specifying, from among a plurality of physical resource block (PRB) pairs in a subframe, one or more sets of one or more PRB pairs that a user equipment (UE) is to monitor for an enhanced physical downlink control channel (EPDCCH), the operations including,
sending, from the network element, a first representation of the plurality of PRB pairs, the representation including a plurality of bits, a total number of the plurality of bits being less than a product of a total number of the plurality of PRB pairs and a total number of the one or more sets, the first representation indicating which of the plurality of PRB pairs are in at least one of the one or more sets of one or more PRB pairs the UE is to monitor for the EPDCCH, the first representation including one or more entries corresponding to each of the plurality of PRB pairs except one or more excluded PRB pairs from among the plurality of PRB pairs, the first representation including no entries corresponding to the one or more excluded PRB pairs, the one or more excluded PRB pairs being PRB pairs of the subframe which are defined as not being available for providing the EPDCCH.

12. The network element of claims 11, wherein the first representation includes one or more logical bitmaps corresponding, respectively, to the one or more sets and, for each of the one or more logical bitmaps, the logical bitmap is logically mapped to the plurality of PRB pairs such that the logical bitmap includes an entry for each of the plurality of PRB pairs except for one or more excluded PRB pairs from among the plurality of PRB pairs, and each entry in the logical bitmap indicates whether or not the PRB pair to which the entry is logically mapped is one of the PRB pairs to be monitored for the EPDCCH by the UE in the set corresponding to the logical bitmap.

13. The network element of claim 11, wherein the processing unit is further configured to control operations including, sending, from the network element, one or more logical bitmaps, the one or more logical bitmaps corresponding, respectively, to the one or more sets, the one or more logical bitmaps being logically mapped to the plurality of PRB pairs such that, for each of the one or more second logical bitmaps, the logical bitmap includes entries only for the PRB pairs that are to be monitored for the EPDCCH by the UE, and each of the entries included in the logical bitmap indicates whether or not the PRB pair to which the entry is logically mapped is a member of the set corresponding to the second logical bitmap.

14. The network element of claim 11, wherein the first representation includes one or more location indicators, the one or more location indicators correspond, respectively, to the one or more sets, each of the one or more location indicators includes offset information and spacing information defining a pattern of PRB pairs within the plurality of PRB pairs and, for each of the one or more location indicators, the defined pattern is logically mapped to the plurality of PRB pairs such that the defined pattern includes an entry for each of the plurality of PRB pairs except for one or more excluded PRB pairs from among the plurality of PRB pairs, and each entry in the defined pattern indicates whether or not the PRB pair to which the entry is logically mapped is one of the PRB pairs to be monitored for the EPDCCH by the UE.

15. The network element of claim 11, wherein the processing unit is further configured to control operations including, sending, from the network element, one or more second representations, each of the one or more second representations including offset information and spacing information defining a pattern of PRB pairs within the plurality of PRB pairs, the one or more representations corresponding, respectively, to the one or more sets, the one or more defined patterns being logically mapped to the plurality of PRB pairs such that, for each of the one or more second representations, the defined pattern of the second representation includes entries only for the PRB pairs that are to be monitored for the EPDCCH by the UE, and each of the entries included in the defined pattern of the second representation indicates whether or not the PRB pair to which the entry is logically mapped is a member of the set corresponding to the second representation.

16. A mobile device comprising:

a processing unit configured to control operations for determining, from among a plurality of physical resource block (PRB) pairs in a subframe, one or more sets of one or more PRB pairs the mobile device is to monitor for the enhanced physical downlink control channel (EPDCCH), the operations including, receiving, at the mobile device, a first representation of the plurality of PRB pairs, the representation including a plurality of bits, a total number of the plurality of bits being less than a product of a total number of the plurality of PRB pairs and a total number of the one or more sets, the first representation indicating which of the plurality of PRB pairs are in at least one of the one or more sets of one or more PRB pairs the mobile device is to monitor for the EPDCCH;

selecting one or more PRB pairs to monitor for the EPDCCH from among the plurality of PRB pairs based on the first representation, the first representation including one or more entries corresponding to each of the plurality of PRB pairs except one or more excluded PRB pairs from among the plurality of PRB pairs, the first representation including no entries corresponding to the one or more excluded PRB pairs, the one or more excluded PRB pairs being PRB pairs of the subframe which are defined as not being available for providing the EPDCCH.

17. The mobile device of claim 16, wherein the first representation includes one or more logical bitmaps corresponding, respectively, to the one or more sets and, for each of the one or more first logical bitmaps, the logical bitmap is logically mapped to the plurality of PRB pairs such that the logical bitmap includes an entry for each of the plurality of PRB pairs except for one or more excluded PRB pairs from among the plurality of PRB pairs, and each entry in the logical bitmap indicates whether or not the PRB pair to which the entry is logically mapped is one of the PRB pairs to be monitored for the EPDCCH by the mobile device.

18. The mobile device of claim 16, wherein the processing unit is further configured to control operations including, receiving, at the mobile device, one or more logical bitmaps, each of the one or more logical bitmaps corresponding, respectively, to the one or more sets, the one or more logical bitmaps being logically mapped to the plurality of PRB pairs such that, for each of the one or more logical bitmaps, the logical bitmap includes entries only for the PRB pairs that are to be monitored for the EPDCCH by the mobile device, and each of the entries included in the logical bitmap indicates whether or not the PRB pair to which the entry is logically mapped is a member of the set corresponding to the logical bitmap; and determining, for each of the one or more selected PRB pairs, which of the one or more sets the selected PRB pair belongs to based on the one or more logical bitmaps.

19. The mobile device of claim 16, wherein the first representation includes one or more location indicators, the one or more location indicators correspond, respectively, to the one or more sets, each of the one or more location indicators includes offset information and spacing information defining a pattern of PRB pairs within the plurality of PRB pairs and, for each of the one or more location indicators, the defined pattern is logically mapped to the plurality of PRB pairs such that the defined pattern includes an entry for each of the plurality of PRB pairs except for one or more excluded PRB pairs from among the plurality of PRB pairs, and each entry in the defined pattern indicates whether or not the PRB pair to which the entry is logically mapped is one of the PRB pairs to be monitored for the EPDCCH by the mobile device.

20. The mobile device of claim 16, wherein the processing unit is further configured to control operations including, receiving, at the mobile device, one or more second representations, each of the one or more second representations including offset information and spacing information defining a second pattern of PRB pairs within the plurality of PRB pairs, the one or more second representations corresponding, respectively, to the one or more sets, the one or more defined patters being logically mapped to the plurality of PRB pairs such that, for each of the one or more second representations, the defined pattern of the second representation includes entries only for the PRB pairs that are to be monitored for the EPDCCH by the mobile device, and each of the entries included in the defined pattern of the second representation indicates whether or not the PRB pair to which the entry is logically mapped is a member of the set corresponding to the second representation; and determining, for each of the one or more selected PRB pairs, which of the one or more sets the selected PRB pair belongs to based on the one or more second representations.

\* \* \* \* \*